United States Patent
Yao et al.

(10) Patent No.: US 9,989,805 B2
(45) Date of Patent: Jun. 5, 2018

(54) DISPLAY PANEL AND A DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Shulin Yao, Xiamen (CN); Poping Shen, Xiamen (CN); Lei Han, Shanghai (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 0 days. days.

(21) Appl. No.: 15/044,297

(22) Filed: Feb. 16, 2016

(65) Prior Publication Data

US 2016/0238897 A1 Aug. 18, 2016

(30) Foreign Application Priority Data

Feb. 13, 2015 (CN) .......................... 2015 1 0078147

(51) Int. Cl.
*G02F 1/1335* (2006.01)

(52) U.S. Cl.
CPC .. *G02F 1/133617* (2013.01); *G02F 1/133514* (2013.01); *G02F 2001/133538* (2013.01); *G02F 2001/133565* (2013.01); *G02F 2202/36* (2013.01)

(58) Field of Classification Search
CPC ......... G02F 1/133617; G02F 1/133514; G02F 2001/133614; G02F 2202/36; H05B 33/14
See application file for complete search history.

(56) References Cited

U.S. PATENT DOCUMENTS

| 5,738,918 A * | 4/1998 | Shen ...................... C09K 19/60 349/96 |
| 2010/0201909 A1* | 8/2010 | Jung ................. G02F 1/133528 349/61 |
| 2012/0113672 A1* | 5/2012 | Dubrow ................. B82Y 20/00 362/602 |

(Continued)

FOREIGN PATENT DOCUMENTS

| CN | 1114512 A | 1/1996 |
| CN | 102541329 A | 7/2012 |

(Continued)

*Primary Examiner* — Michael Caley
*Assistant Examiner* — Jonathan Y Jung
(74) *Attorney, Agent, or Firm* — Anova Law Group, PLLC (57) ABSTRACT

A liquid crystal display panel includes a TFT substrate; a backlight system configured to emit light beams in a first color; a color film substrate having at least a first subpixel, a second subpixel, and a third subpixel; a liquid crystal layer; and a polarization system. The first subpixel is configured to let the light beams in the first color pass through and to emit the light beams in the first color. The second subpixel includes a plurality of first quantum dots and a plurality of second quantum dots and is configured to emit light beams in at least a second color based on the light beams in the first color. The third subpixel includes a plurality of third quantum dots and a plurality of fourth quantum dots and is configured to emit light beams in at least a fourth color based on the light beams in the first color.

14 Claims, 5 Drawing Sheets

(56) References Cited

U.S. PATENT DOCUMENTS

| | | | |
|---|---|---|---|
| 2012/0154698 A1* | 6/2012 | Matsuhiro | G02B 27/2264 349/15 |
| 2014/0204319 A1 | 7/2014 | Cai et al. | |
| 2015/0185381 A1* | 7/2015 | Wu | G02B 5/201 349/106 |

FOREIGN PATENT DOCUMENTS

| | | |
|---|---|---|
| CN | 103226259 A | 7/2013 |
| CN | 103353629 A | 10/2013 |
| CN | 203658706 U | 6/2014 |
| CN | 104330918 A | 2/2015 |
| KR | 1020100093858 A | 8/2010 |
| WO | 2009078426 A1 | 6/2009 |

* cited by examiner

DISPLAY PANEL AND A DISPLAY DEVICE

CROSS-REFERENCES TO RELATED APPLICATIONS

This application claims the priority of Chinese patent application No. 201510078147.7, filed on Feb. 13, 2015, the entirety of which is incorporated herein by reference.

FIELD OF THE INVENTION

The present invention generally relates to the planar display technology and, more particularly, relates to a liquid crystal display panel and a liquid crystal display device containing the liquid crystal display panel.

BACKGROUND

Liquid crystal display (LCD), demonstrating a number of advantages such as light weight, small thickness, low power consumption, etc., has been widely used in televisions, cell phones, monitors, and other electronic products.

Currently, the color LCD technology usually includes a blue light-emitting diode (LED), a backlight system formed on the surface of the blue LED with red phosphor and green phosphor, and a color film substrate formed with red color barriers, green color barriers, and blue color barriers. However, when light passes through each color barrier, beams with a wavelength corresponding to either one of the other two colors will be certainly lost, thus the rate of transmission loss is nearly ⅔ after light passes through the color film substrate.

The disclosed LCD display panel and LCD display device are directed to solve one or more problems set forth above and other problems.

BRIEF SUMMARY OF THE DISCLOSURE

The present disclosure provides a liquid crystal display panel and a liquid crystal display device to, for example, improve the transmission rate of current LCD panels.

One aspect of the present disclosure provides a liquid crystal display panel. The liquid crystal display panel includes: a thin-film transistor (TFT) substrate; a backlight system configured to emit light beams in a first color to pass through the TFT substrate; a color film substrate arranged corresponding to the TFT substrate and having at least a first subpixel, a second subpixel, and a third subpixel; a liquid crystal layer disposed between the TFT substrate and the color film substrate; and a polarization system arranged corresponding to the backlight system and including a light entry side and a light exit side. The first subpixel is configured to let the light beams in the first color pass through and to emit the light beams in the first color. The second subpixel includes a plurality of first quantum dots and a plurality of second quantum dots and is configured to emit light beams in at least a second color based on the light beams in the first color. The third subpixel includes a plurality of third quantum dots and a plurality of fourth quantum dots and is configured to emit light beams in at least a third color based on the light beams in the first color.

Another aspect of the present disclosure provides a liquid crystal display device containing the liquid crystal display panel described above.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
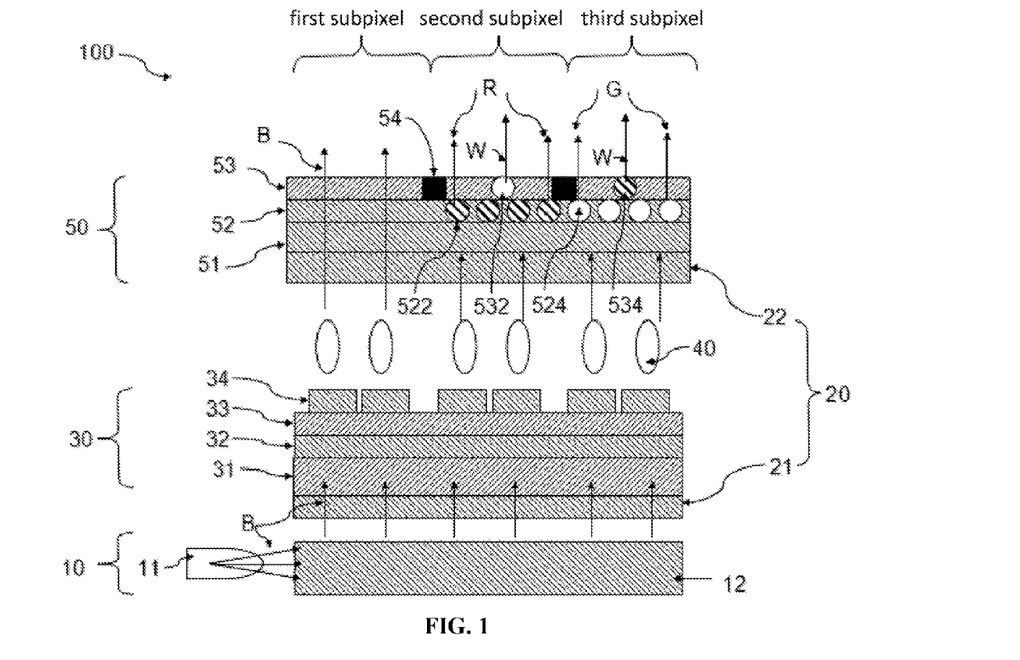
FIG. 1 illustrates a schematic cross-section view of the structure of a liquid crystal display panel consistent with disclosed embodiments.

FIG. 1 shows a schematic cross-section view of the structure of a liquid crystal display panel of the present disclosure. Referring to FIG. 1, the liquid crystal display panel 100 includes a backlight system 10, a polarization system 20, a TFT array substrate 30, a liquid crystal layer 40, and a color film substrate 50. Other components may also be included.

The backlight system 10 is used to emit light beams in a first color. The backlight system 10 may be a straight down type backlight system or a side entry type backlight system. In one embodiment, the backlight system 10 is a straight down type backlight system. The backlight system 10 may include an LED light source 11 and a light guide plate 12. The light guide plate 12 is arranged corresponding to the polarization system 20 and the LED light source 11 may be arranged on one side of the light guide plate 12.

The LED light source 11 may be a blue light-emitting diode, an ultraviolet light-emitting diode, or any other type of light-emitting diode. In one embodiment, the light source 11 is a blue light-emitting diode and the light beams in the first color are blue light.

The polarization system 20 may include a first polarization layer 21 and a second polarization layer 22. The polarization direction of the first polarization layer 21 is perpendicular to the polarization direction of the second polarization layer 22. The second polarization layer 22 is arranged on the far-side of the TFT array substrate 30 away from the liquid crystal layer 40. The far-side of the first polarization layer 21 away from the TFT array substrate 30 is the light entry side of the polarization system 20. The near-side of the second polarization layer 22 close to the color film substrate 50 is the light exit side of the polarization system 20.

Figure 2:
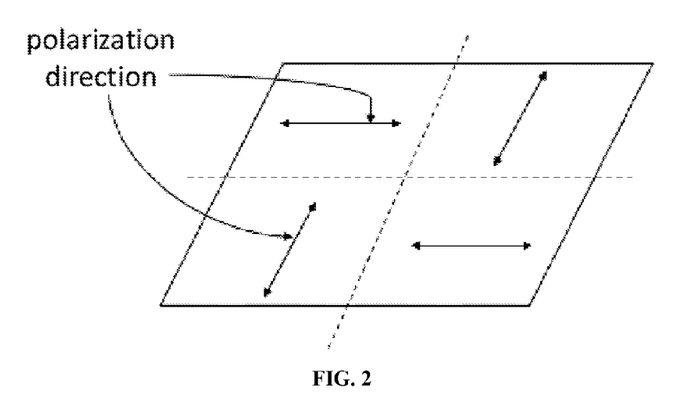
FIG. 2 illustrates a schematic diagram of the polarization directions of different regions of the regionalized polarization layer in the display panel consistent with disclosed embodiments.

FIG. 2 shows a schematic diagram of the polarization directions of different regions of a regionalized polarization layer of the display panel consistent with disclosed embodiments. Referring to FIG. 2, both the first polarization layer 21 and the second polarization layer 22 may be regionalized polarizers. Each regionalized polarizer has at least one region having a polarization direction different from the polarization direction of other regions of the regionalized polarizer.

Specifically, the polarization direction of at least one first region of the first polarization layer 21 is different from the polarization direction of a second region of the first polarization layer 21; or, the polarization direction of at least one third region of the second polarization layer 22 is different from the polarization direction of a fourth region of the second polarization layer 22. In each corresponding region, the polarization direction of the first polarization layer 21 may be perpendicular to the polarization direction of the second polarization layer 22.

For example, when the first region of the first polarization layer 21 corresponds to the third region of the second polarization layer 22, the polarization direction of the first region of the first polarization layer 21 is perpendicular to the polarization direction of the third region of the second polarization layer 22; when the second of the first polarization layer 21 corresponds to the fourth region of the second polarization layer 22, the polarization direction of the second region of the first polarization layer 21 is perpendicular to the polarization direction of the fourth region of the second polarization layer 22. The first region, the second region, the third region, and the fourth region may correspond to a pixel, a subpixel, or any other bigger or smaller area on the substrates. When the first region and the second region of the first polarization layer 21 are arranged in an array and the positions of the first region and the second region correspond to the positions of the third region and the fourth region of the second polarization layer 22, respectively, the liquid crystal display panel 100 may have three-dimensional (3D) display function.

The regionalized polarization layer may include a base material and a polarizing material. The polarizing material may be doped into the base material. The base material may be one or more of cellulose triacetate, polyimide, and polyamide acid, etc. The base material may have desired photo-alignment properties. Under irradiation of polarized ultraviolet light, the molecular chains of the base material may take a certain orientation, correspondingly, the orientation of the polarizing material may also be changed in respond to the alignment of the molecular chains of the base material, and thus the polarizing material is also aligned along a certain direction.

The polarizing material may include a dichroic organic dye with a dichroic ratio greater or equal to 7. The dichroic organic dye may be one or more of azo dye, anthraquinone dye, biphenyl dye, triphenyl dioxazine dye and its derivatives, single-methine dye, multi-methine dye, and poly ring dye, etc. The dichroic organic dye may be aligned under irradiation of polarized ultraviolet light. In addition, because of the dichroic property of these dichroic organic dyes, only light with a certain polarization direction is transmitted under the irradiation of natural light, while the light with the other polarization direction is blocked. Therefore, these dichroic organic dyes may function as a polarizer.

The structure of azo dichroic organic dye may be as follows:

where

Further, by introducing appropriate electron donating/attracting groups to the end of the molecules of azo dichroic organic dye, the difference in the polarization directions of different regions of a polarizer may be defined more accurately. Therefore, the accuracy of the regionalized polarizer is improved and the stability of the polarizer is also improved. The reason for this improvement might be that, by introducing the electron donating/attracting groups, the dichroic properties of the material are improved.

Moreover, the polarizing material may further include materials with a structure of benzidine, diphenyl urea, stilbene, two naphthylamine, J-acid, or anthraquinone.

Figure 3:
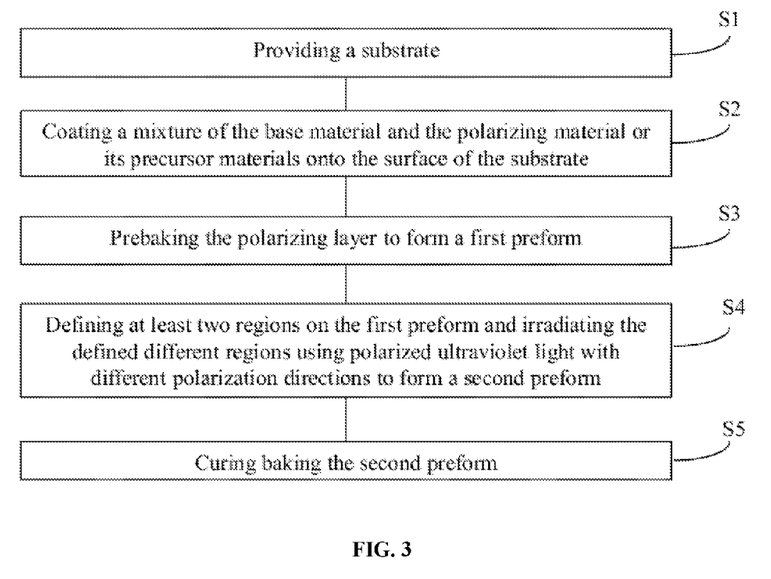
FIG. 3 illustrates a flowchart for fabricating a regionalized polarization layer in the liquid crystal display panel consistent with disclosed embodiments.

FIG. 3 illustrates a flowchart of an exemplary method for fabricating a regionalized polarization layer in the liquid crystal display panel consistent with disclosed embodiments. Referring to FIG. 3, the regionalized polarization layer may be formed by the following fabrication procedures:

Step S1: providing a substrate. The substrate may be made of any appropriate material, such as quartz, glass, or resin.

Step S2: coating a mixture of the base material and the polarizing material or its precursor material onto the surface of the substrate. The mixture may be coated by a spin-coating method. In one embodiment, a mixture of polyimide and azo dye is coated on the substrate.

Step S3: prebaking the polarization layer to form a first preform. Specifically, the prebaking temperature may be in a range of 90° C.~130° C. and the prebaking time may be in a range of 60 s~120 s. In one embodiment, the prebaking temperature is about 130° C., while the prebaking time is about 120 s.

Step S4: Defining at least two regions on the first preform and irradiating the defined different regions using polarized ultraviolet light with different polarization directions to form a second preform;

Irradiating the first preform with polarized ultraviolet light may let the polarizing material and/or the base material aligned along certain direction. The energy of the polarized ultraviolet light may be in a range of 300 mJ~1000 mJ. In one embodiment, the energy of the polarized ultraviolet light is selected to be in a range of 500 mJ~800 mJ. Using this irradiation energy, the photo-alignment properties of polyimide films may be desired. Thus, the irradiation energy helps the alignment of the azo dye, and desired polarization performance may be achieved.

Figure 4:
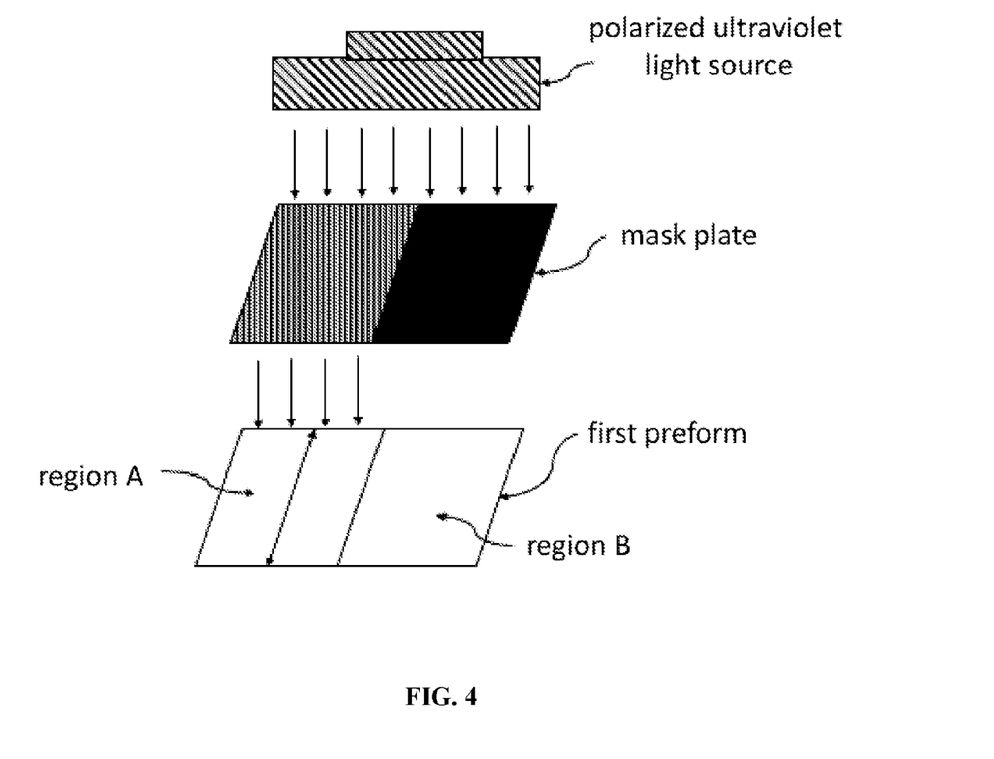
FIG. 4 illustrates a processing diagram of the irradiation process for fabricating a regionalized polarization layer consistent with disclosed embodiments.

FIG. 4 shows a schematic diagram of the irradiating process for fabricating a regionalized polarization layer consistent with disclosed embodiments. Referring to FIG. 4, the first preform may have a region A and a region B, and may be placed under a polarized ultraviolet light source. A mask plate for the irradiating process may be placed between the polarized ultraviolet light source and the first preform.

During the irradiating process, first, the polarized ultraviolet light source and the mask plate are provided. The polarized ultraviolet light source can generate ultraviolet light polarized along the first polarization direction. The mask plate has at least one transparent area and one light-shielding area.

Then, region B of the first preform is shielded by the shielding area of the mask plate while region A of the first preform is exposed through the transparent area of the mask plate. Further, the polarized ultraviolet light source is used to irradiate the exposed region A so that region A of the first preform is aligned. The first preform is then rotated by a certain angle so that the desired second polarization direction of the regionalized polarization layer to be formed now coincides with the polarization direction of the ultraviolet light. In the meantime, the shielding area of the mask plate is changed to cover region A of the first preform while the transparent area of the mask plate is used to expose region B of the first preform. Finally, the polarized ultraviolet light source is used to irradiate the exposed region B so that region B of the first preform is aligned along the second polarization direction.

Returning to FIG. 3, the irradiating process further includes Step S5: curing baking the second preform to form the regionalized polarization layer.

The curing baking temperature may be in a range of 210° C.~230° C. and the curing baking time may be in a range of 20 min~50 min. In one embodiment, the curing baking temperature is about 230° C., while the curing baking time is about 30 min.

Returning to FIG. 1, the structure and the type of the TFT array substrate 30 are not limited to any specific choice. The TFT array substrate 30 may be Fringe Field Switching (FFS) type, In-Plane Switching (IPS) type, or any other type. In one embodiment, the TFT array substrate 30 is a FFS type substrate including a first substrate 31, a common electrode 32, an insulating layer 33, and a plurality of pixel electrodes 34. The common electrode 32, the insulating layer 33, and the pixel electrodes 34 are formed layer by layer on the surface of the first substrate 31 close to the liquid crystal layer 40. The common electrode 32 and the plurality of pixel electrodes 34 of the TFT array substrate 30 may form a plurality of subpixels.

The liquid crystal layer 40 is arranged between the TFT array substrate 30 and the color film substrate 50. The liquid crystal layer 40 may be made of any appropriate liquid crystal material with a positive or a negative dielectric anisotropy.

The color film substrate 50 includes a second substrate 51, a first light-emitting layer 52, a second light-emitting layer 53, and a black matrix 54. The first light-emitting layer 52 and the second light-emitting layer 53 may be stacked together and formed on the surface of the second substrate 51. The formation of the first light-emitting layer 52 and the second light-emitting layer 53 is not limited to any specific order. That is, the first light-emitting layer 52 may be formed above or below the second light-emitting layer 53. In one embodiment, the first light-emitting layer 52 is formed on the far-side surface of the second substrate 51 away from the second polarization layer 22; while the second light-emitting layer 53 is formed on the far-side surface of the first light-emitting layer 52 away from the polarization layer 22.

The color film substrate 50 corresponds to at least one first subpixel, one second subpixel, and one third subpixel.

A single pixel may include several (e.g., three) colored elements. For example, in a RGB (red-green-blue) color model, the three colored elements are red, green, and blue. Some display panels, however, have more than three color primaries in a single pixel. For example, in a WRGB (white-red-green-blue) color model, a pixel on a color display may have four colored elements: white, red, green, and blue. The colored elements may be called subpixels. Under certain circumstances, such as 3D display, a subpixel may also be referred to as a pixel, thus pixel and subpixel may be used interchangeably in such cases.

In one embodiment, the first subpixel is configured to let light beams in the first color pass through, thus emits light beams in the first color. That is, the area that the first subpixel corresponds to contains neither the first light-emitting layer 52 nor the second light-emitting layer 53; or, in the area that the first subpixel corresponds to, the first light-emitting layer 52 and the second light-emitting layer 53 are transparent layers so that light beams in the first color is transmitted without being affected by the first light-emitting layer 52 and the second light-emitting layer 53. In one embodiment, the first light-emitting layer 52 and the second light-emitting layer 53 in the area that the first subpixel corresponds to are both transparent layers, and neither the first light-emitting layer 52 nor the second light-emitting layer 53 emits any light in the area, thus allowing the transmission of blue light (i.e., light in the first color) without being affected.

The first light-emitting layer 52 corresponding to the second subpixel may include a plurality of first quantum dots 522. The second light-emitting layer 53 corresponding to the second subpixel may include a plurality of second quantum dots 532. The density of the first quantum dots 522 may be higher than the density of the second quantum dots 532. Here, the density refers to the number of quantum dots per unit area. Optionally, the density of the first quantum dots 522 may be more than 5 times of the density of the second quantum dots 532.

The first quantum dots 522 are used to absorb light beams in the first color and emit light beams in a second color. The second quantum dots 532 are used to absorb light beams in the first color and emit light beams in a third color. Moreover, light beams in the first color, the second color, and the third color may be partially mixed together to form white light.

The first quantum dots 522 may include red quantum dots and/or green quantum dots, etc. The second quantum dots 532 may include red quantum dots, green quantum dots, and/or yellow quantum dots, etc. In one embodiment, the first quantum dots 522 are red quantum dots; while the second quantum dots 532 are green quantum dots. Because the first light-emitting layer 52 corresponding to the second subpixel includes a plurality of red quantum dots and the second light-emitting layer 53 corresponding to the second subpixel includes a plurality of green quantum dots, the second subpixel may emit red light or green light. Further, because the density of the red quantum dots is higher than the density of the green quantum dots, green light may be mixed with a portion of red light and blue light to form white light while the other portion of red light is directly transmitted through the second subpixel. In other words, the second subpixel may simultaneously emit red light and white light.

Thus, the type and the density of the first quantum dots 522 and/or the second quantum dots 532 may be predetermined based on pixel/subpixel configurations. For example, the density of the quantum dots may be determined to keep the pixel/subpixel transparent as not to block light passing through the polarization system 20. Also, the density of the first quantum dots 522 and/or the second quantum dots 532 based on the color of the pixel/subpixels corresponding to the first quantum dots 522 and/or the second quantum dots 532. Further, the first quantum dots 522 and/or the second quantum dots 532 may be distributed uniformly within the second subpixel to keep a uniform intensity of the emitted light.

The first light-emitting layer 52 corresponding to the third subpixel may include a plurality of third quantum dots 524. The second light-emitting layer 53 corresponding to the third subpixel may include a plurality of fourth quantum dots 534. The density of the third quantum dots 524 may be higher than the density of the fourth quantum dots 534. Optionally, the density of the third quantum dots 524 may be more than 5 times of the density of the fourth quantum dots 534.

The third quantum dots 524 are used to absorb light beams in the first color and emit light beams in a fourth color. The second quantum dots 534 are used to absorb light beams in the first color and emit light beams in a fifth color. Moreover, light beams in the first color, the fourth color, and the fifth color may be partially mixed together to form white light.

The third quantum dots 524 may include red quantum dots and/or green quantum dots, etc. The fourth quantum dots 534 may include red quantum dots, green quantum dots, and/or yellow quantum dots, etc. In one embodiment, the third quantum dots 524 are green quantum dots while the fourth quantum dots 534 are red quantum dots. In other words, in such embodiment, the first quantum dots 522 are the same as the fourth quantum dots 534, and the second quantum dots 532 are the same as third quantum dots 524. Because the first light-emitting layer 52 corresponding to the third subpixel includes a plurality of green quantum dots and the second light-emitting layer 53 corresponding to the third subpixel includes a plurality of red quantum dots, the third subpixel may emit green light or red light. Further, because the density of the green quantum dots is higher than the density of the red quantum dots, red light may be mixed with a portion of green light and blue light to form white light while the other portion of green light is directly transmitted through the second subpixel. In other words, the third subpixel may simultaneously emit green light and white light.

Thus, the type and the density of the third quantum dots 524 and/or the fourth quantum dots 534 may be predetermined based on pixel/subpixel configurations. For example, the density of the quantum dots may be determined to keep the pixel/subpixel transparent as not to block light passing through the polarization system 20. Also, the density of the third quantum dots 524 and/or the fourth quantum dots 534 can be determined or adjusted based on the color of the pixel/subpixels corresponding to the third quantum dots 524 and/or the fourth quantum dots 534. Further, the third quantum dots 524 and/or the fourth quantum dots 534 may be distributed uniformly within the third subpixel to keep a uniform intensity of the emitted light.

The arrangement of the first light-emitting layer 52 and the second light-emitting layer 53 is not limited to the order described above. The first light-emitting layer 52 and the second light-emitting layer 53 may be spaced from each other. For example, the first light-emitting layer 52 and the second light-emitting layer 53 may be separately formed on the two opposite surfaces of the second substrate 51. More generally, as long as the first light-emitting layer 52 and the second light-emitting layer 53 are both arranged on either the light entry side or the light exit side of the polarization system 20, the first light-emitting layer 52 and the second light-emitting layer 53 may be arranged in any appropriate configuration. For example, the first light-emitting layer 52 and the second light-emitting layer 53 may be formed on the near-surface of the light guide plate 12 close to the TFT substrate 30.

Figure 6:
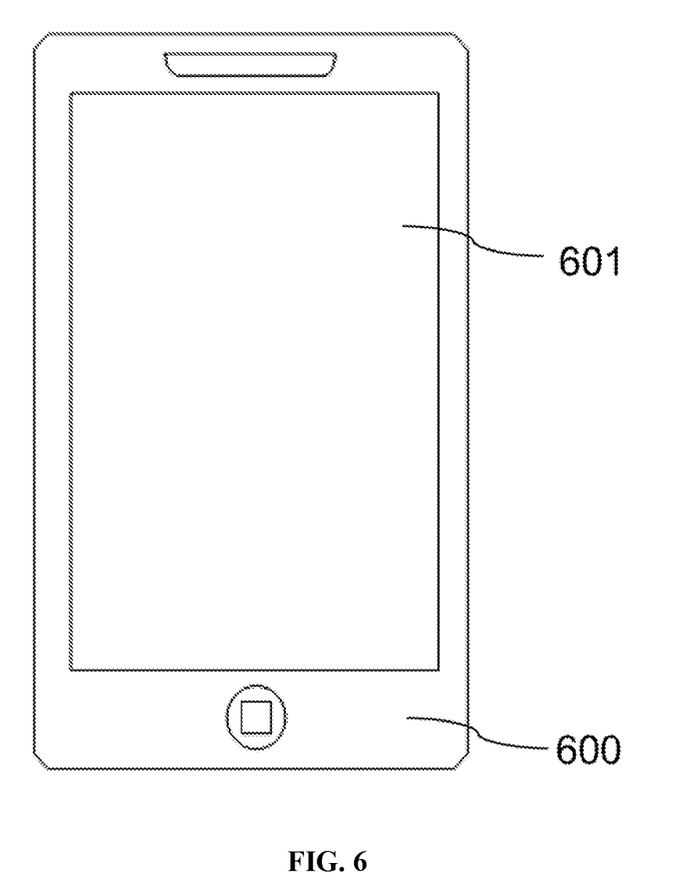
FIG. 6 illustrates an exemplary display device consistent with disclosed embodiments.

The present disclosure also provides a display device containing the liquid crystal display panel described above. As an example, shown in FIG. 6, a display device (e.g., a smart phone device) 600 includes the above described display panel 601. In other embodiments, the disclosed liquid crystal display panel may also be adopted in devices with display screens, such as television, computer monitor, etc.

The disclosed liquid crystal display panel and the disclosed liquid crystal display device use quantum dots with light-emitting functions as color film substrates, thus when light beams pass through the color film substrate, the color film substrate does not block the light beams. Therefore, the transmission rate of the disclosed liquid crystal display panel and the disclosed liquid crystal display device is significantly improved. In addition, in the second subpixel and also in the third subpixel, light beams may be partially mixed with each other to form white light, so that the color gamut of the liquid crystal display panel and the liquid crystal display device is further improved.

Figure 5:
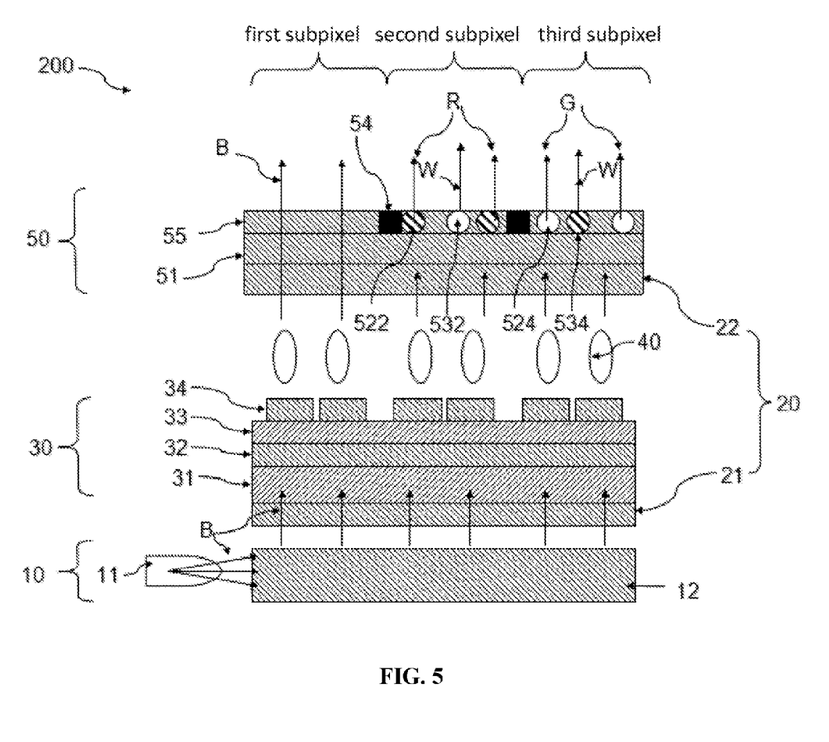
FIG. 5 illustrates a schematic cross-section view of the structure of a liquid crystal display panel consistent with disclosed embodiments.

FIG. 5 shows a schematic cross-section view of the structure of another liquid crystal display panel of the present disclosure. Referring to FIG. 6, the structure of the liquid crystal display panel 200 in one embodiment may be substantially the same as the display panel 100 described above. For example, the liquid crystal display panel 200 includes a backlight system 10, a polarization system 20, a TFT array substrate 30, a liquid crystal layer 40, and a color film substrate 50.

However, as shown in FIG. 5, the color film substrate 50 in the liquid crystal display panel 200 includes only a single third light-emitting layer 55 while the liquid crystal display panel 100 in FIG. 1 includes two light-emitting layers. The single third light-emitting layer 55 may include both the first quantum dots 522 and the second quantum dots 532. That is, the first quantum dots 522 and the second quantum dots 532 are not in separate light-emitting layers, but are mixed in the single third light-emitting layer 55.

The second quantum dots 532 and the first quantum dots 522 in the area of the third light-emitting layer 55 corresponding to the second subpixel are uniformly mixed and distributed. The third quantum dots 524 and the fourth quantum dots 534 in the area of the third light-emitting layer corresponding to the third subpixel are also uniformly mixed and distributed.

Specifically, the density of the first quantum dots 522 may be higher than the density of the second quantum dots 532. Optionally, the density of the first quantum dots 522 may be more than 5 times of the density of the second quantum dots 532.

The first quantum dots 522 are used to absorb light beams in the first color and emit light beams in a second color. The second quantum dots 532 are used to absorb light beams in the first color and emit light beams in a third color. Moreover, light beams in the first color, the second color, and the third color may be partially mixed together to form white light.

The first quantum dots 522 may include red quantum dots and/or green quantum dots, etc. The second quantum dots 532 may include red quantum dots, green quantum dots, and/or yellow quantum dots, etc. In one embodiment, the first quantum dots 522 are red quantum dots; while the second quantum dots 532 are green quantum dots. Because the third light-emitting layer 55 corresponding to the second subpixel includes a plurality of red quantum dots and a plurality of green quantum dots, the second subpixel may emit red light or green light. Further, because the density of the red quantum dots is higher than the density of the green quantum dots, green light may be mixed with a portion of red light and blue light to form white light while the other portion of red light is directly transmitted through the second subpixel. In other words, the second subpixel may simultaneously emit red light and white light.

Thus, the type and the density of the first quantum dots 522 and/or the second quantum dots 532 may be predetermined based on pixel/subpixel configurations. For example, the density of the quantum dots may be determined to keep the pixel/subpixel transparent as not to block light passing through the polarization system 20. Also, the density of the first quantum dots 522 and/or the second quantum dots 532 can be determined or adjusted based on the color of the pixel/subpixels corresponding to the first quantum dots 522 and/or the second quantum dots 532. Further, the first quantum dots 522 and/or the second quantum dots 532 may be distributed uniformly within the second subpixel to keep a uniform intensity of the emitted light.

The density of the third quantum dots 524 may be higher than the density of the fourth quantum dots 534. Optionally, the density of the third quantum dots 524 may be more than 5 times of the density of the fourth quantum dots 534.

The third quantum dots 524 are used to absorb light beams in the first color and emit light beams in a fourth color. The second quantum dots 534 are used to absorb light beams in the first color and emit light beams in a fifth color. Moreover, light beams in the first color, the fourth color, and the fifth color may be partially mixed together to form white light.

The third quantum dots 524 may include red quantum dots and/or green quantum dots, etc. The fourth quantum dots 534 may include red quantum dots, green quantum dots, and/or yellow quantum dots, etc. In one embodiment, the third quantum dots 524 are green quantum dots while the fourth quantum dots 534 are red quantum dots. Because the third light-emitting layer 55 corresponding to the third subpixel includes a plurality of green quantum dots and a plurality of red quantum dots, the third subpixel may emit green light or red light. Further, because the density of the green quantum dots is higher than the density of the red quantum dots, red light may be mixed with a portion of green light and blue light to form white light while the other portion of green light is directly transmitted through the second subpixel. In other words, the third subpixel may simultaneously emit green light and white light.

Thus, the type and the density of the third quantum dots 524 and/or the fourth quantum dots 534 may be predetermined based on pixel/subpixel configurations. For example, the density of the quantum dots may be determined to keep the pixel/subpixel transparent as not to block light passing through the polarization system 20. Also, the density of the third quantum dots 524 and/or the fourth quantum dots 534 can be determined or adjusted based on the color of the pixel/subpixels corresponding to the third quantum dots 524 and/or the fourth quantum dots 534. Further, the third quantum dots 524 and/or the fourth quantum dots 534 may be distributed uniformly within the third subpixel to keep a uniform intensity of the emitted light.

Of course, the formation of the third light-emitting layer 55 is not limited to be on the surface of the second substrate 51 as shown in FIG. 5, the third light-emitting layer 55 may also be arranged at any other appropriate position as long as the third light-emitting layer 55 is ensured to be formed on the light entry side or the light exit side of the polarization system 20. For example, the third light-emitting layer 55 may be arranged to be at the near-surface of the light guide plate 12 close to the TFT substrate 30.

By using the liquid crystal display panels and the liquid crystal display devices, various LCD display applications may be implemented with certain advantages. First, by using quantum dots with light-emitting function as color film substrate, the color film substrate does not block light beams when the light beams pass through the color film substrate, thus the transmission rate of the liquid crystal display panel and the liquid crystal display device is significantly improved. Further, because light beams may partially mix together with each other in the second subpixel and also in the third subpixel and form white light, the liquid crystal display panel and the liquid crystal display device have display effect equivalent to the WRGB (white-red-green-blue) color model, further improving the color gamut of the liquid crystal display panel and the liquid crystal display device. Finally, the number of white spots of liquid crystal display panel and display device may be reduced by adjusting the distribution and the density of the quantum dots in the second subpixel and the third subpixel.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A liquid crystal display panel, comprising:
a thin-film transistor (TFT) substrate;
a backlight system configured to emit light beams in a first color to pass through the TFT substrate;
a color film substrate arranged corresponding to the TFT substrate corresponding to at least a first subpixel, a second subpixel, and a third subpixel, and having a second substrate, a black matrix, a first light-emitting layer, and a second light-emitting layer;
a liquid crystal layer disposed between the TFT substrate and the color film substrate; and
a polarization system arranged corresponding to the backlight system and including a light entry side and a light exit side,
wherein:
the first subpixel is configured to let the light beams in the first color pass through and to emit the light beams in the first color;
the first light-emitting layer corresponding to the second subpixel includes a plurality of first quantum dots and the second light-emitting layer corresponding to the second subpixel includes a plurality of second quantum dots, and the second subpixel is configured to emit light beams in at least a second color based on the light beams in the first color;
the first light-emitting layer corresponding to the third subpixel includes a plurality of third quantum dots and the second light-emitting layer corresponding to the third subpixel includes a plurality of fourth quantum dots, and the third subpixel is configured to emit light beams in at least a third color based on the light beams in the first color;
the first light-emitting layer is formed on a far-side of the second substrate away from the polarization system, and has a first surface facing the second substrate and an opposing surface;
the second light-emitting layer is formed on the opposing surface of the first light-emitting layer;
the first quantum dots are configured to absorb light beams in the first color and emit light beams in the second color;
the second quantum dots are configured to absorb light beams in the first color and emit light beams in the third color;
a density of the first quantum dots included in the first light-emitting layer corresponding to the second subpixel is higher than a density of the second quantum dots included in the second light-emitting layer corresponding to the second subpixel;
a portion of the light beams in the second color is mixed with the light beams in the first color and the third color to form white light emitted from the second subpixel, while another portion of the light beams in the second color is directly emitted from the second subpixel; and the black matrix is disposed in the second light-emitting layer but not in the first light-emitting layer.

2. The liquid crystal display panel according to claim 1, wherein:
the first light-emitting layer further contains the plurality of third quantum dots; and
the second light-emitting layer further contains the plurality of fourth quantum dots.

3. The liquid crystal display panel according to claim 1, wherein:
the third quantum dots are configured to absorb light beams in the first color and emit light beams in the third color;
the fourth quantum dots are configured to absorb light beams in the first color and emit light beams in the second color;
a density of the third quantum dots included in the first light-emitting layer corresponding to the third subpixel is higher than a density of the fourth quantum dots included in the second light-emitting layer corresponding to the third subpixel; and
a portion of the light beams in the third color is mixed with the light beams in the first color and the second color to form white light while emitted from the third subpixel, another portion of the light beams in the third color is directly emitted from the third subpixel.

4. The liquid crystal display panel according to claim 3, wherein the backlight system includes a blue light-emitting diode and the first color is blue.

5. The liquid crystal display panel according to claim 1, wherein:
the first quantum dots include a plurality of red quantum dots while the third quantum dots include a plurality of green quantum dots; and
the second quantum dots and the fourth quantum dots include one or more of red quantum dots, green quantum dots, and yellow quantum dots.

6. The liquid crystal display panel according to claim 3, wherein:
the density of the first quantum dots is more than 5 times of the density of the second quantum dots;
the density of third quantum dots is more than 5 times of the density of the fourth quantum dots;
the density of the first quantum dots is approximately the same as the density of the third quantum dots; and
the density of the second quantum dots is approximately the same as the density of the fourth quantum dots.

7. The liquid crystal display panel according to claim 1, wherein the polarization system further includes a first polarization layer and a second polarization layer arranged corresponding to the first polarization layer.

8. The liquid crystal display panel according to claim 7, wherein a near-side of the first polarization layer close to the backlight system is the light entry side and a far-side of the second polarization layer away from the backlight system is the light exit side.

9. The liquid crystal display panel according to claim 8, wherein:
a polarization direction of at least one first region of the first polarization layer is different from a polarization direction of other regions of the first polarization layer; and
a polarization direction of at least one second region of the second polarization layer is different from a polarization direction of other regions of the second polarization layer.

10. The liquid crystal display panel according to claim 9, wherein the first polarization layer and the second polarization layer both include a base material and a polarizing material doped into the base material.

11. The liquid crystal display panel according to claim 10, wherein the polarizing material includes a dichroic organic dye.

12. The liquid crystal display panel according to claim 11, wherein the dichroic organic dye is one or more of azo dye, anthraquinone dye, biphenyl dye, triphenyl dioxazine dye and its derivatives, single-methine dye, multi-methine dye, and poly ring dye.

13. The liquid crystal display panel according to claim 12, wherein the base material is one or more of cellulose triacetate, polyimide, and polyamide acid.

14. A liquid crystal display device containing a liquid crystal display panel, wherein the liquid crystal display panel comprises:
   a thin-film transistor (TFT) substrate;
   a backlight system configured to emit light beams in a first color to pass through the TFT substrate;
   a color film substrate arranged corresponding to the TFT substrate corresponding to at least a first subpixel, a second subpixel, and a third subpixel, and having a second substrate, a black matrix, a first light-emitting layer, and a second light-emitting layer;
   a liquid crystal layer disposed between the TFT substrate and the color film substrate; and
   a polarization system arranged corresponding to the backlight system and including a light entry side and a light exit side,
   wherein:
   the first subpixel is configured to let the light beams in the first color pass through and to emit the light beams in the first color;
   the first light-emitting layer corresponding to the second subpixel includes a plurality of first quantum dots and the second light-emitting layer corresponding to the second subpixel includes a plurality of second quantum dots, and the second subpixel is configured to emit light beams in at least a second color based on the light beams in the first color;
   the first light-emitting layer corresponding to the third subpixel includes a plurality of third quantum dots and the second light-emitting layer corresponding to the third subpixel includes a plurality of fourth quantum dots, and the third subpixel is configured to emit light beams in at least a third color based on the light beams in the first color;
   the first light-emitting layer is formed on a far-side of the second substrate away from the polarization system, and has a first surface facing the second substrate and an opposing surface;
   the second light-emitting layer is formed on the opposing surface of the first light-emitting layer;
   the first quantum dots are configured to absorb light beams in the first color and emit light beams in the second color;
   the second quantum dots are configured to absorb light beams in the first color and emit light beams in the third color;
   a density of the first quantum dots included in the first light-emitting layer corresponding to the second subpixel is higher than a density of the second quantum dots included in the second light-emitting layer corresponding to the second subpixel;
   a portion of the light beams in the second color is mixed with the light beams in the first color and the third color to form white light emitted from the second subpixel, while another portion of the light beams in the second color is directly emitted from the second subpixel; and
   the black matrix is disposed in the second light-emitting layer but not in the first light-emitting layer.

* * * * *